April 28, 1936.   E. R. WOLFERT ET AL   2,039,044
REGULATING SYSTEM
Filed March 1, 1933   2 Sheets-Sheet 1
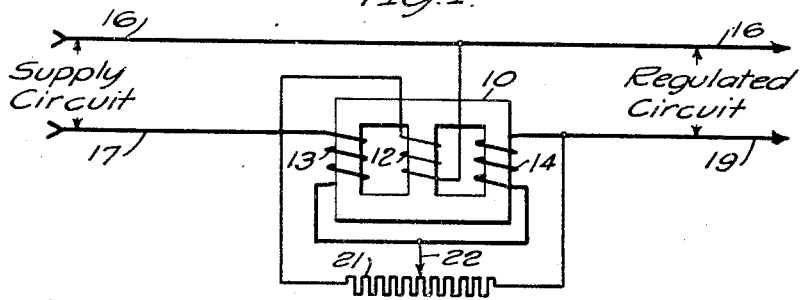
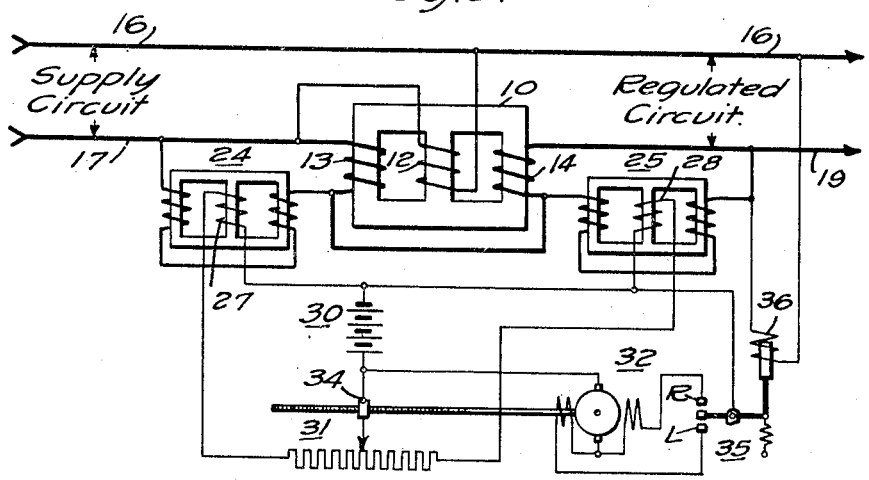
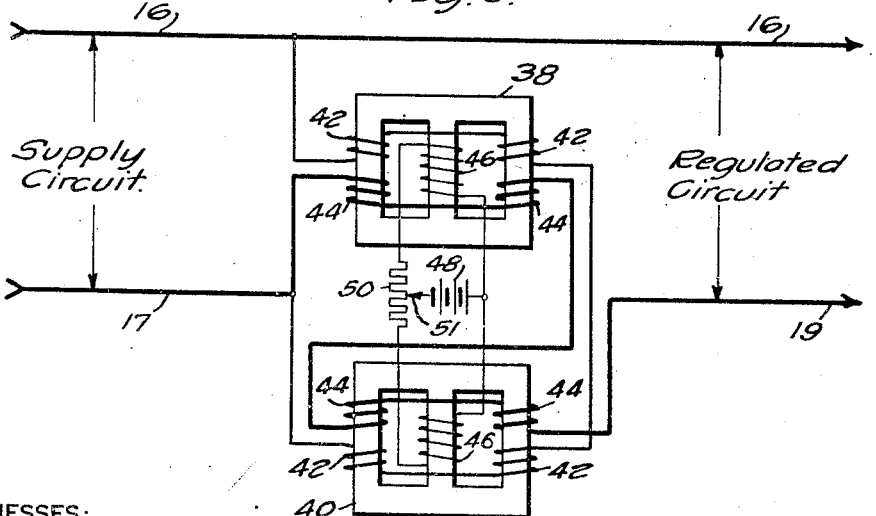
WITNESSES:
E. A. McCloskey
C. F. Bryant
INVENTORS.
Edward R. Wolfert and
Edward C. Wentz.
BY Franklin E. Hardy
ATTORNEY April 28, 1936.   E. R. WOLFERT ET AL   2,039,044
REGULATING SYSTEM
Filed March 1, 1933   2 Sheets-Sheet 2

WITNESSES:

INVENTORS.
Edward R. Wolfert and
Edward C. Wentz.
BY
Franklin E. Hardy
ATTORNEY

Patented Apr. 28, 1936

2,039,044

UNITED STATES PATENT OFFICE 2,039,044

REGULATING SYSTEM

Edward R. Wolfert, Wilkinsburg, and Edward C. Wentz, Sharon, Pa., assignors to Westinghouse Electric & Manufacturing Company, East Pittsburgh, Pa., a corporation of Pennsylvania Application March 1, 1933, Serial No. 659,162

5 Claims. (Cl. 171—119)

Our invention relates to electrical regulators and it has particular relation to regulators of the induction or transformer type utilized with alternating-current circuits for the control of the voltage, current, or other electrical quantity thereof.

One well known type of induction regulator, which has been found to be suitable for the regulation of alternating current circuits, is subject to the disadvantage of employing moving parts, it comprising as is known, primary and secondary windings carried by relatively movable magnetic core structures. Such mechanical construction is expensive to manufacture because of the required machining and fitting of the movable elements and parts, and the operation of the regulator necessitates maintenance procedure.

To eliminate the disadvantages named, there have been devised regulating devices comprising certain non-moving part electrical elements for performing the functions of the above-mentioned moving part regulator. In one well known type of such device, a "booster" transformer of the static type is disposed to introduce a corrective component of voltage into the circuit to be regulated, the magnitude and direction of which component is controlled by changing the impedance offered by a saturable-core reactor connected in the energizing circuit of the booster transformer. Electronic tubes or other equivalent adjusting means are utilized, in the system, to control the core saturation of the reactor device, and hence the impedance offered thereby, in response to changes in the characteristic of the circuit that is to be regulated.

While eliminating moving parts, such a device is subject to the disadvantage of requiring an excessively high voltage range for a given regulating range, since the corrective voltage introduced by the booster transformer is, because of the inductive characteristics of its supply circuit, in substantial quadrature with the circuit voltage when the circuit current is of unity power factor. This corrective voltage is hence much less effective than where an in-phase voltage is available. For example, to change the circuit voltage 10%, the corrective voltage vector in quadrature therewith must have a value of approximately 46% of the circuit voltage. A corresponding excess capacity and bulkiness of equipment is accordingly necessitated in systems of this type.

Our invention is directed to transformer systems, suitable for regulator applications, which eliminate the disadvantages above pointed out and which possess additional advantages to be particularized hereinafter.

One object of our invention is to provide a regulating transformer that shall have a wide range of voltage control in an infinite number of small graduations, as distinguished from a succession of relatively few predetermined steps.

Another object of our invention is to provide a transformer of the above-described character which is particularly suited to regulate alternating current circuits.

Another object of our invention is to provide a regulator of the static-induction type for alternating current circuits that shall be low in cost and capable of an economical utilization of material.

A still further object of our invention is to provide a regulating system of the character described in which the corrective components of voltage introduced into the regulated circuit are substantially in phase with the power voltage acting therein.

More completely stated, it is the object of our invention to provide an induction regulator having no moving parts, which is readily adapted to automatic control, that shall be simple in design, low in cost, reliable in operation and capable of performing the functions heretofore performed by moving-coil type induction regulators.

In practicing our invention, we obtain the foregoing results by the provision of a transformer core structure which carries, in addition to the usual primary winding, a secondary winding having two sections that are connected in opposition and arranged in such manner that the relative magnitudes of the voltages induced in the two sections may be varied throughout a wide range. This adjustment is effected by shifting the division of total primary flux between the two secondary winding sections, which shift may be attained by suitably controlling the reluctances of the portions of magnetic circuit respectively associated with the two secondary windings. In a preferred form of our invention, selective and controllable magnetic saturation produced by direct current excitation of the transformer core structure is employed as a means of reluctance control. The opposition-connected secondary sections may be associated with but a single core structure comprising a plurality of magnetic paths or they may be associated with two separate structures which are jointly influenced by the primary magnetizing force.

Our invention will best be understood from the following description of specific embodiments thereof when taken in conjunction with the accompanying drawings, in which Figure 1 is a diagrammatic view of a transformer comprising a single core structure assembly arranged in accordance with one embodiment of our invention.

Fig. 2 is a similar view of the system of Fig. 1 illustrating automatic control equipment associated therewith.

Fig. 3 is a diagrammatic representation of a transformer comprising two core structure assemblies arranged in accordance with a second embodiment of our invention.

Figure 4:
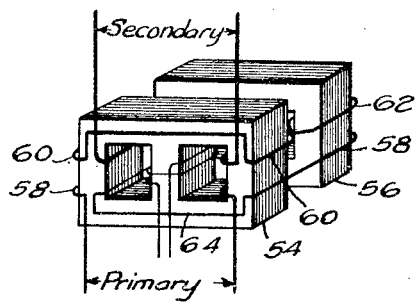
Fig. 4 is a perspective view of two transformer core structures of the type shown in Fig. 3 illustrating a preferred manner of relative positioning and interconnection of the primary and secondary windings thereof.
Figure 5:
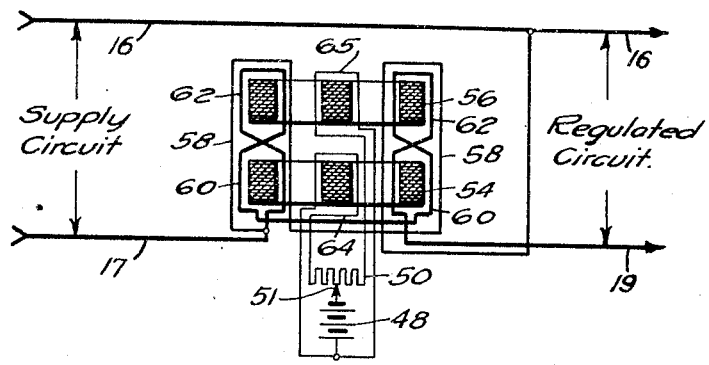
Figure 6:
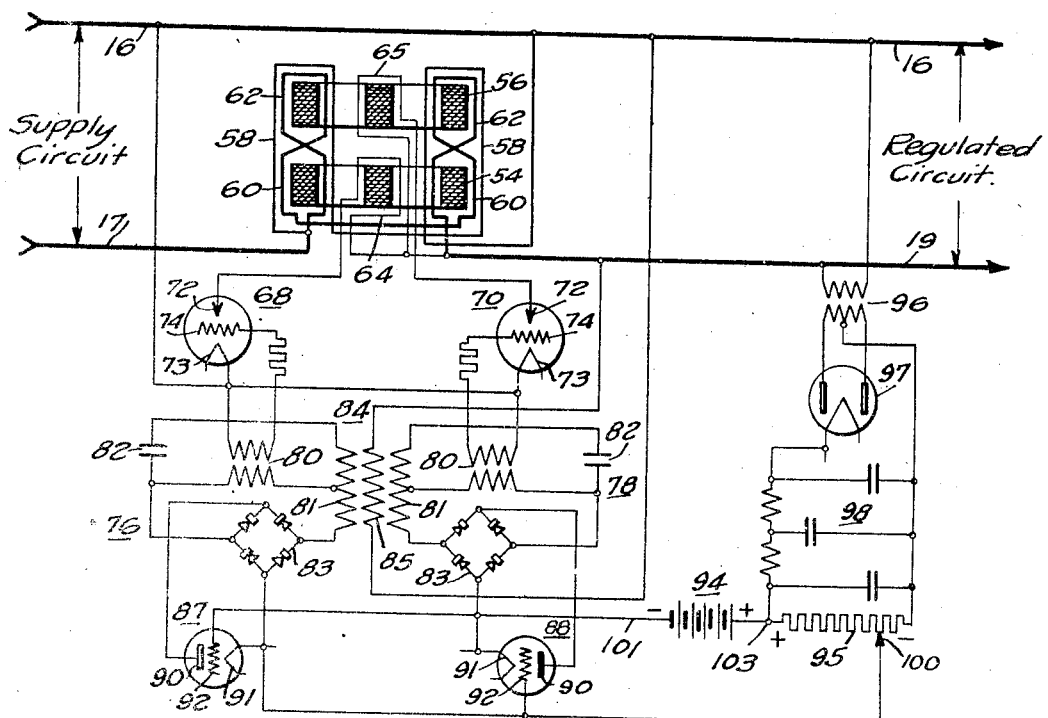

Fig. 5 is a simplified representation of the structure of Fig. 4 showing its connection as a regulator for an alternating current circuit, and Fig. 6 is a diagrammatic representation of the arrangement shown in Figs. 4 and 5 illustrating one manner in which the control circuits thereof may be energized from the alternating-current circuit to be regulated and automatically controlled in accordance with changes in the voltage thereof.

Referring to the drawings and particularly to Fig. 1 thereof, the regulating transformer there illustrated comprises a core structure 10 of a well known three-legged construction. On the middle leg of the structure, a primary winding 12 is positioned causing magnetic flux to pass through the two outer legs, on which outer legs the secondary winding sections 13 and 14 are respectively carried. The primary winding 12 is connected to be energized by the voltage existing between the conductors 16 and 17 of an alternating current supply circuit, and the secondary winding sections 13 and 14 are connected in opposition to complete a circuit from the supply conductor 17 to the regulated circuit conductor 19. Across the winding sections 13 and 14 an adjustable resistor 21 is connected, and is provided with a movable tap connection 22 common to the circuits of both winding sections to control the flux distribution through the two outer legs of transformer core 10.

Movement of the tap connection 22 along the resistor 21 acts to simultaneously vary, in opposite directions, the impedances which respectively shunt winding sections 13 and 14. Lowering the impedance shunting one secondary winding section in effect raises the magnetic reluctance of the core leg with which that section is associated and thus causes a smaller proportion of the primary winding flux to flow through that leg of the core structure. Hence, assuming that, in the system of Fig. 1, the voltage induced in the winding section 13 is directly in phase with the supply circuit voltage so that it adds thereto and the voltage induced in the winding section 14 is in phase opposition therewith to subtract therefrom, a movement of the tap connection 22 to the right will serve to raise the voltage supplied to the regulating circuit 16—19, and movement to the left will correspondingly lower the voltage supplied thereto.

The system of Fig. 1 just described may be adapted for automatic control, as is illustrated in Fig. 2. In Fig. 2, the adjustable shunting impedances are in the form of saturable-core reactance devices 24 and 25. The effective impedance of each of these devices is varied by changing the magnitude of a direct current supplied to the exciting windings 27 and 28 thereof. As illustrated, this exciting current is supplied from a battery 30 and controlled by means of a rheostat 31 that is operated by a motor 32. Movement of the slider 34 of the rheostat to the left increases the saturation of the device 24 and decreases that of the device 25 thereby effecting a lowering and raising, respectively, of the impedances of the two devices named, which, in turn, lowers the voltage of the regulated circuit 16—19. In a similar manner, operation of the rheostat in the opposite direction effects a raising of the regulated circuit voltage. As illustrated, the motor 32 is energized in the voltage-raising and lowering directions through circuits which include contact members R and L respectively of a contact making voltmeter device 35, the actuating winding 36 of which is energized by the voltage of the regulated circuit.

The embodiment of our invention illustrated in Fig. 3 utilizes two transformer assemblies respectively comprising core structures 38 and 40, each of which is of a well known three-legged construction adapted for saturation control. Each of the outer legs of each structure carries a section of primary winding 42 and a section of secondary winding 44. The primary winding sections 42 of both transformer assemblies are all series connected and connected to be energized from the supply circuit 16—17. The two secondary winding sections 44 of the transformer core 38 are connected in opposition with sections 44 of the transformer core 40 to complete a connection from the supply-circuit conductor 17 to the regulated-circuit conductor 19.

A saturating winding 46 is provided on the central core leg of each transformer which, in the system of Fig. 3, is connected to be energized by direct current from a battery 48 through a resistor 50 and a controlling tap connection 51. Movement of the connecting tap 51 upwardly along the resistor increases the saturation of the transformer core 38 and decreases that of the core 40, and a downward movement raises the saturation of the core 40 and lowers that of the core 38.

Assuming that the magnetic characteristics of the transformer cores 38 and 40 are similar, the series connected primary windings 42 will effect similar magnetizations thereof so that balanced values of voltage in the secondary winding sections 44 of the two cores will result. Because of the opposition connection of the winding sections the two balanced secondary voltages neutralize each other. However, raising the saturation of one core and lowering that of the other, by respectively decreasing and increasing the magnetic reluctances thereof, causes a greater portion of the total flux produced by all of the primary winding sections to be circulated through the core having the lower reluctance than through the one having the higher reluctance. The result is a corresponding unbalance between the secondary voltages of the two transformer assemblies which causes a corrective component of voltage to be introduced into the regulated circuit.

It will thus be apparent that by proper control of the saturation of the two transformer cores, in the system of Fig. 3 by adjustment of the resistor tap connection 51, the direction of the regulating component may be adjusted throughout a wide range of values. It will be understood that, if desired, automatic control equipment of the general type illustrated in Fig. 2 or its equivalent may be combined with the system of Fig. 3 in a manner that the voltage or other characteristic of the regulated circuit will automatically be maintained at a constant value in spite of fluctuations in the supply circuit voltage.

An effective arrangement of the two separate saturable-core transformer assemblies, is illustrated in the perspective view of Fig. 4, in which the two core structures 54 and 56 are positioned side by side in such manner that the primary winding 58 may be common to both of them. The secondary winding sections 60 and 62 of the two structures are preferably inter-connected in the manner indicated in Fig. 5 which is a sectional view of the two core structures of Fig. 4. This secondary winding connection is such that the voltages induced in the winding sections 60 combine with each other to jointly oppose the voltages induced in winding sections 62. Thus, assuming that the transformers 54 and 56 are of identical construction their secondary winding voltages will neutralize each other unless the magnetic circuit is controlled.

In the system of Fig. 5 as in the system of Fig. 3, the core reluctance is controlled by the saturating windings 64 and 65 positioned about the central legs of cores 54 and 56 respectively. These windings may be energized from any suitable direct-current source represented in Figs. 3 and 5, as battery 48 connected to the resistor 50 by the tap connection 51. This arrangement, as has already been explained in connection with the system of Fig. 3, is capable of simultaneously varying the saturation of the two transformer cores in opposite directions to effect corresponding shifts in the distribution of the total primary winding flux between the two cores thus controlling the secondary circuit voltage.

In operation of the regulating system illustrated in Fig. 5, when the tap connection 51 is in its mid-position on the resistor 50, as illustrated, the transformer cores 54 and 56 are saturated to equal degrees and the secondary voltages of these two transformers, being equal, neutralize each other with the result that the voltage of the regulated circuit is the same as that of the supply circuit. Assuming that the phase position of the voltage induced in the secondary winding sections 60 is such as to aid the supply circuit voltage, and that of the potential induced in sections 62 is such as to oppose the voltage in the supply circuit, a movement of tap connection 51 to the right lowers the opposing component and raises the aiding component of the secondary voltage thus increasing the saturation of the core 56 and decreasing that of the core 54 with the result that the voltage of the regulated circuit is increased. In a similar manner, movement of the tap 51 to the left causes the regulated circuit voltage to be lowered with respect to that of the supply circuit. As will be evident, the magnitude of these corrective components is dependent upon the difference in magnetic saturation of the two transformer cores, which difference is controllable by the adjustment of tap 51.

It will be apparent that any suitable means, specifically different from that illustrated in Fig. 5, may be utilized to supply and control the direct current energization of the core saturating windings 64 and 65. Thus, as exemplified by the showing in Fig. 6, these two exciting windings may be supplied with rectified current derived from the alternating current supply circuit and controlled automatically in a manner to maintain the regulated circuit voltage or other characteristics constant.

In Fig. 6 the transformer-core saturating windings are supplied from the voltage between the main-circuit conductors 16 and 19 through circuits which include electronic tubes 68 and 70 for the two windings 64 and 65 respectively. Tubes 68 and 70 are preferably of the grid-controlled gas-filled type, each being capable of conducting current only from the anode element 72 to the cathode element 73 thereof. The effective value of this current may be controlled by changing the character of the potential impressed upon the tube grid element 74. Grid-control potential for tubes 68 and 70 is supplied respectively by phase-shifting bridge circuits 76 and 78, each of which comprises a grid-influencing transformer 80 connected between the midpoint of the secondary winding 81 of a transformer 84 and a conductor connecting a capacitor 82 and a full-wave rectifier 83. The capacitor and rectifier of each bridge circuit are connected in series and energized from the secondary winding 81 inductively related to a common primary winding 85, that is energized directly from the regulated circuit.

The amount of phase shift between the voltage in transformer 80 of each bridge and the regulated circuit voltage is controlled by varying the effective resistance of the rectifier 83, which variation is effected by an electronic tube shown at 87 for bridge 76, and at 88 for the circuit 78. The tubes 87 and 88 are preferably of the vacuum type, the anode and cathode elements 90 and 91 being connected with the direct-current terminals of the rectifier 83, and the grid element 92 being influenced by a control potential, the magnitude of which is determined by the regulated circuit voltage.

The phase shifting bridge circuits 76 and 78, illustrated in Fig. 6, and control means therefor, are more completely described in a copending application Serial No. 568,537 by F. H. Gulliksen, filed October 13, 1931, and assigned to the same assignee as this application. As is pointed out in that application, when the grid element 92 of the vacuum tube is made more negative with respect to the cathode element 91, the resulting increased impedance offered by the tube causes rectifier 83 of the bridge circuit to offer a higher value of resistance. This increased rectifier resistance effects an increase in the displacement angle between the voltages of transformers 80 and 84. As a result of this increased displacement in the voltage impressed upon the grid 74 of the gas-filled tube, the effective current passed by this tube to the associated transformer core saturating winding is lowered. In a similar manner, a change in the positive direction of vacuum tube grid bias effects an increase in the current supplied from the alternating current circuit to the saturating winding of the transformer.

Consequently, in the system of Fig. 6, the energization of the exciting winding 64 may be raised by changing the grid bias of tube 87 in the positive direction and lowered by changing the bias in the negative direction. Similarly, the energization of the exciting winding 65 may be raised by making the grid bias of vacuum tube 88 more positive and lowered by making this bias more negative.

In the regulating system of our invention, it is, as has been pointed out, necessary that the energization of the two transformer exciting windings 64 and 65 be simultaneously varied in opposite directions, which, in the case of the control equipment already described in the system of Fig. 6 requires that the grid biases of tubes 87 and 88 be simultaneously varied in opposite directions. To effect such variation, automatically in response to changes in the regulated-circuit voltage, a standard potential battery 94 is connected in opposition to the voltage across a resistor 95, across which a direct current voltage is impressed, from a circuit comprising a transformer 96, a full-wave rectifying device 97 and filter equipment 98. This direct current voltage is proportional to the voltage of the regulated circuit 16—19 and is applied to the grid circuits of the two vacuum tubes named. The potential difference between the battery 94 and the resistor 95 is supplied to the grids of the two tubes through conductors 101 and 102, it being noted that the grid of tube 87 and the cathode of tube 88 are connected with conductor 101, and the grid of tube 88 and cathode of tube 87 with conductor 102.

The setting of the adjustable tap connection 100, to which conductor 102 is connected, is such that, at the desired value of the regulated circuit voltage, the direct-current potential appearing between points 103 and the connection 100 of resistor 95 is substantially equal to that of the standard potential battery 94. For such a condition, there will be impressed upon the two tubes a substantially zero grid bias. Hence, as the total voltage impressed upon resistor 95 is increased, the grid bias of tube 87 is changed in the positive direction and that of tube 88 is simultaneously changed in the negative direction. Similarly, as the voltage impressed across the resistor 95 is decreased, the bias of tube 87 is changed in the negative direction and that of tube 88 in the positive direction.

In the operation of the regulating system shown in Fig. 6, an increase in the regulated circuit voltage above its desired value correspondingly increases the direct-current potential across the resistor 95 and makes the grid bias of tube 88 more negative and that of tube 87 more positive thus decreasing the effective current passed by the excitation control tube 70 to decrease the saturation of the transformer core 56, and increase the effective current passed by the tube 68 to increase the saturation of transformer core 54. This action causes the voltage induced in the secondary winding sections 62, which, as has been previously explained, opposes the supply circuit voltage, to become greater than that of winding sections 60, which aids the supply circuit voltage with the result that voltage of the regulated circuit is lowered.

Similarly, when the voltage of the regulated circuit falls below the desired value, the attending decrease in potential appearing across resistor 95, by changing the grid bias of tube 87 in the negative direction and that of tube 88 in the positive direction, lowers the saturation of transformer core 54 and raises that of core 56. As a result, the supply circuit aiding voltage induced in secondary winding sections 60 becomes greater than the opposing voltage induced in winding sections 62 and the regulated circuit voltage is accordingly raised.

Although we have shown and described certain specific embodiments of our invention, we are fully aware that many modifications thereof are possible. Our invention, therefore, is not to be restricted except insofar as is necessitated by the prior art and by the scope of the appended claims.

We claim as our invention:

1. In combination, an alternating-current circuit, a regulating transformer therefor comprising two magnetic-core structures, a primary winding energized from said circuit for magnetizing both of said structures, two sections of secondary winding respectively associated with said structures and connected in opposition in series with said circuit, and a pair of windings for respectively controlling the reluctances of said structures, means, comprising circuits, for supplying energizing currents to said control windings, an electronic tube associated with each winding circuit in a manner to control the current therein, and means for impressing upon said two tubes control potentials which may be simultaneously adjusted in oppositely-changing directions to cause the transformer-control winding currents to be oppositely varied.

2. In combination, an alternating-current circuit, a regulating transformer therefor comprising two magnetic-core structures, a primary winding energized from said circuit for magnetizing both of said structures, two sections of secondary winding respectively associated with said structures and connected in opposition in series with said circuit, and a pair of windings for respectively controlling the reluctances of said structures, means, comprising circuits, for supplying energizing currents to said control windings, an electronic tube associated with each winding circuit in a manner to control the current therein, means for impressing control potentials upon said two tubes, and means responsive to changes in a characteristic of said alternating current circuit for simultaneously varying in opposite directions said two control potentials.

3. In combination, an alternating-current circuit, a regulating transformer therefor comprising two magnetic core structures, a primary winding energized from said circuit for magnetizing both of said structures, two sections of secondary winding respectively associated with said structures and connected in opposition in series with said circuit, and a pair of windings for respectively controlling the reluctances of said structures, means for supplying from said alternating-current circuit direct-current energization to each of said control windings comprising a grid-controlled electronic rectifier tube disposed in an energizing circuit for each winding, and means for impressing upon said two tubes control potentials which may be simultaneously adjusted in oppositely changing directions.

4. In combination, an alternating-current circuit, a regulating transformer therefor comprising two magnetic-core structures, a primary winding energized from said circuit for magnetizing both of said structures, two sections of secondary winding respectively associated with said structures and connected in opposition in series with said circuit, and a pair of windings for respectively controlling the reluctances of said structures, means for supplying from said alternating-current circuit direct-current energization to each of said control windings comprising a grid-controlled electronic rectifier tube disposed in an energizing circuit for each winding, means for impressing control potentials upon said two tubes, and means responsive to changes in a characteristic of said alternating-current circuit for simultaneously varying in opposite directions said two control potentials.

5. Apparatus for regulating a characteristic of an alternating-current circuit comprising a magnetic-circuit structure made up of two side-by-side positioned core assemblies each of which comprises a central core leg which carries a reluctance-control winding and two outer core legs each of which carries a section of secondary winding, a section of primary winding surrounding each of the two pairs of side-by-side positioned outer legs of the two core assemblies of said structure, means for energizing said primary winding sections by the voltage of said circuit, means for connecting the secondary winding sections of said two core assemblies in series opposition in said circuit, means for energizing said reluctance-control windings, and means for varying the relative energizations of these windings to thereby change the distribution of primary winding flux between the two core assemblies.

EDWARD R. WOLFERT.
EDWARD C. WENTZ.